L. Taggart. Sheet 2, 2 Sheets.
Life Preserving Raft.
No. 535. Reissued Mar. 2, 1858.
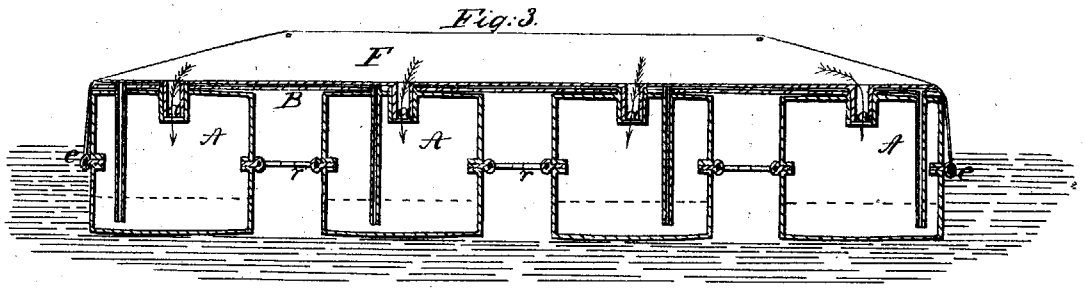
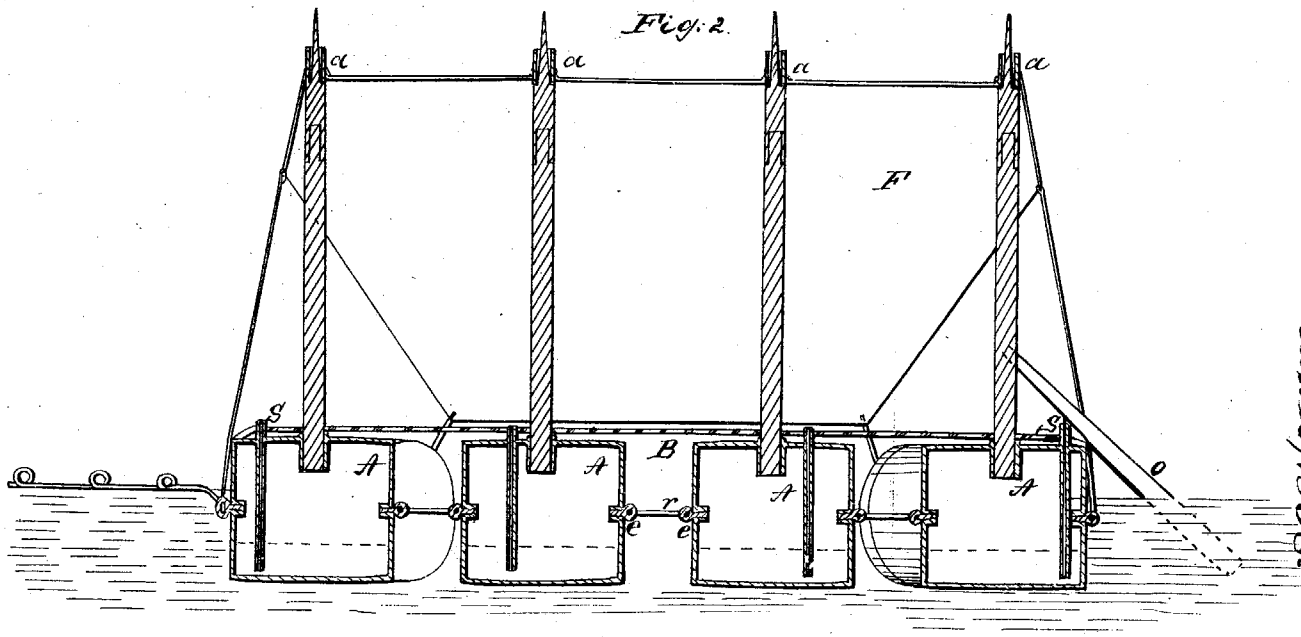
N. PETERS, PHOTO-LITHOGRAPHER, WASHINGTON, D. C.

UNITED STATES PATENT OFFICE.

LORENZO TAGGART, OF PHILADELPHIA, PENNSYLVANIA.

IMPROVEMENT IN LIFE-PRESERVING RAFTS.

Specification forming part of Letters Patent No. 19,216, dated January 26, 1858; Reissue No. 535, dated March 2, 1858.

*To all whom it may concern:*

Be it known that I, LORENZO TAGGART, of the city and county of Philadelphia, and State of Pennsylvania, have invented a new and useful Improvement in Life-Preserving Rafts; and I do hereby declare that the following is a full, clear, and exact description of the construction and operation of the same, reference being had to the annexed drawings, forming part of this specification, in which—

Figure 1 is a top view of the life-preserving raft. Fig. 2 is a vertical section through center, with awning spread. Fig. 3 is a similar view, showing awning used as a water-receiver. Fig. 4 is a view showing attachment of eye *e*. Fig. 5 is a view showing manner of closing cask-openings. Fig. 6 shows connecting-bar.

Similar characters of reference in the several figures denote the same part.

The raft is designed to be constructed of wooden water casks or tanks, or their equivalent, fastened together in a way hereinafter to be set forth, and used in connection with a rope net-work, painted canvas covering, and other appliances, all of which will be duly specified. The floats A are designed to be the ordinary water-casks of ships, though nothing herein stated will prevent the use of floats, either metallic or wooden, made especially for the purpose. The eyes *e*, with which the connecting-rods *r* are connected have a flange resting upon packing between it and the cask, while its shank is secured by a strong screw passing into the cask and by a nut inside, as shown in Fig. 4. The rods *r*, connecting the casks, have an eye at one end and a catch at the other, as shown in Fig. 6. The eye being fastened in an eye, *e*, of a cask, and the spring-catch capable of instant connection, the securing of the casks together will be the work of but few minutes. These rods by their rigidity prevent the casks from being dashed against each other, while at the same time they give a free connection to the floats, and enable them to give to the motion of the waves. There may be as many of these floats used as is desired, depending on the number of persons to be supported. The raft thus formed is to be covered by a rope net-work, B, to prevent the passengers from being washed off between the floats. The casks are designed to be receptacles for food, water, and other articles necessary for shipwrecked persons, the water-casks containing about one-fourth of their capacity of water. Other casks are provided with articles of food, medicine, signal-rockets, compass, lamp, matches, blankets, and any other necessaries that prudence may suggest. The openings of the casks are made with a flanged-cylinder, screwed into the cask until its flange will rest upon packing between it and the cask. The opening of this cylinder will be large enough to admit the hand and arm, and will have a screw-thread on the inside, so that a screw-plug will close the opening, as shown in Fig. 5. The water-casks have each a small tube, *t*, running nearly to the bottom, closed at top with a screw-plug. This permits the sucking of water from the cask, without the danger of salt-water being admitted to the interior.

F is a large sheet of painted canvas, the dimensions of the raft. Along its middle line are inserted a series of short tubes, *a*, equal in number to the number of the central line of casks, and separated by the space between the openings of the aforesaid casks. These tubes receive the pointed extremities of the poles *p*, so that when the lower ends of these poles are inserted in the top openings of the casks, the central line of the canvas will be lifted in a ridge. Then by drawing the edges of the canvas outward an awning is formed for the protection of the passengers. This awning may be employed as a sail by elevating one portion and drawing the edges outward, as the circumstances of the case will suggest. The most important use of this canvas is the following: The tubes *a* are made to fit in the top openings of the casks, so that by inverting the canvas, placing the tubes in the aforesaid openings, and drawing out the edges of the canvas, a receiver is formed with outlets into the casks for securing a supply of rain-water. There are small sockets S on the front and rear casks, and also on some of the side ones, to receive the pin of the oar *o* for steering or rowing.

D D are cords with pieces of wood tied to them, and towed over the sides of the raft, to sustain persons who may be washed off, or who are attempting to gain the raft. One or more of the casks may be used as a receptacle for the mail and other valuables.

The employment of the casks used for water and provisions on ship-board renders the construction of this raft very economical, and is important from the fact that the vessel need not be crowded by floats made especially for the purpose. The filling of the water-casks to one fourth their capacity of water, leaving the remainder to be occupied with air, provides a ballast to the central line of the raft, besides furnishing sustenance to the passengers.

The manner of securing the eyes *e* and closing the provisions and other casks is of great importance, and will be fully understood from the drawings. The rods *r* are by the use of the spring-catches, as shown in Fig. 6, of the best possible construction for the purpose.

What I claim, and desire to secure by Letters Patent, is—

A life-preserving raft formed by the ordinary water casks or tanks of ships, having eyes secured thereto so as to be air-tight, and connected by spring stay-rods, substantially as described, in combination with a rope network and canvas sheet, operating as and for the purpose set forth.

LORENZO TAGGART.

Witnesses:
JOHN THOMPSON,
SAMUEL DAY.